Figure 1:
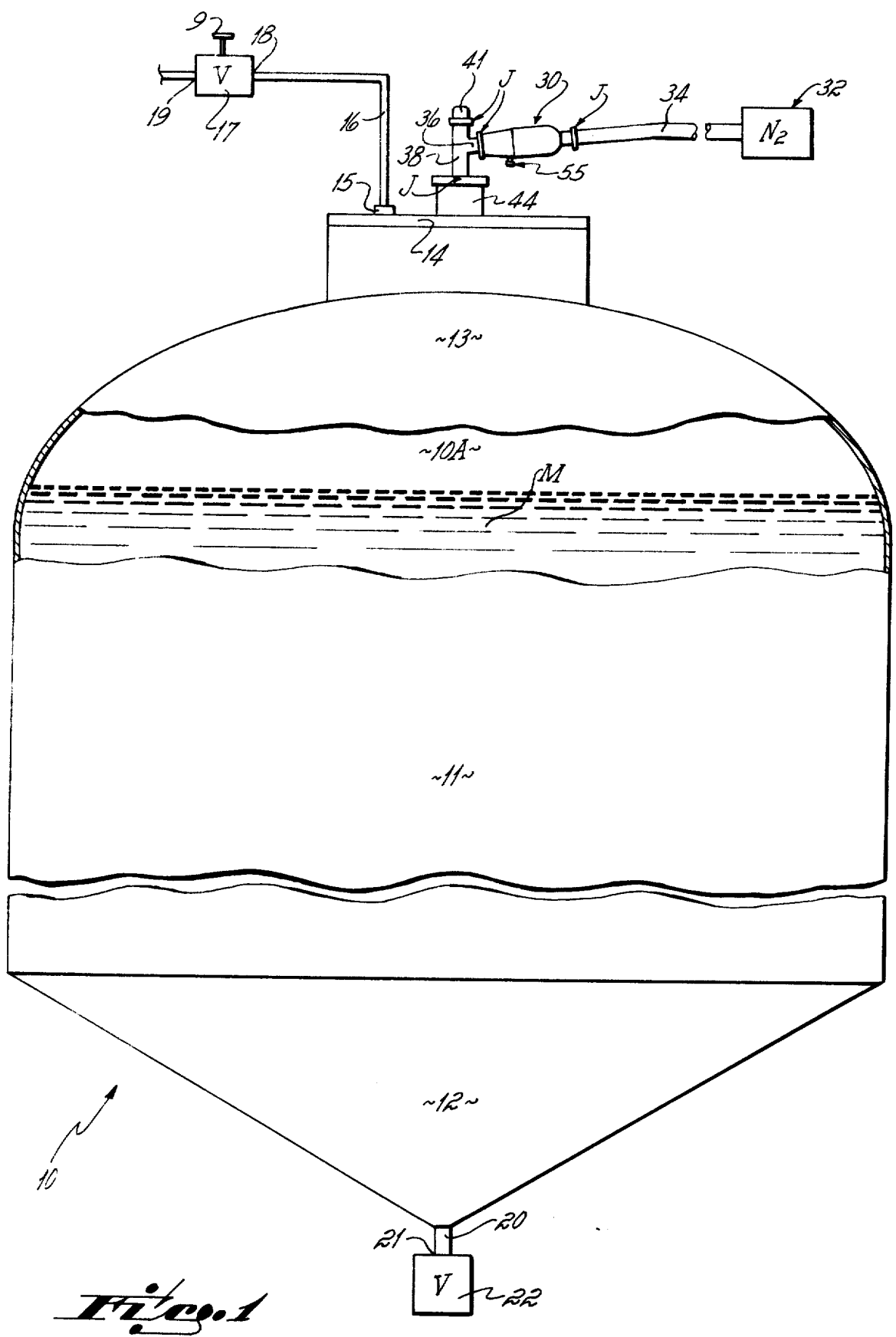

United States Patent
Rechtsteiner et al.

[11] 3,918,942
[45] Nov. 11, 1975

[54] ASEPTIC STORAGE SYSTEM FOR BULK MATERIALS AND IMPROVED MICROBIOLOGICAL FILTER THEREFOR

[75] Inventors: Steve A. Rechtsteiner, Cincinnati, Ohio; Philip E. Nelson, West Lafayette, Ind.; Marinus deBonte, Mississanga, Canada

[73] Assignee: Purdue Research Foundation, West Lafayette, Ind.

[22] Filed: May 3, 1974

[21] Appl. No.: 466,672

[52] U.S. Cl. .................. 55/385; 55/498; 55/505; 55/509; 210/172; 220/88 B
[51] Int. Cl.² ..................................... B01D 31/00
[58] Field of Search ............ 55/274, 279, 466, 385, 55/498, 509, 524, 517, 505; 220/88 B; 210/172, 257; 53/22 R, 112 R; 426/418

[56] References Cited
UNITED STATES PATENTS

| | | | |
|---|---|---|---|
| 2,375,834 | 5/1945 | Walker | 220/88 B |
| 2,617,351 | 11/1952 | Graham, Jr. et al. | 426/418 |
| 2,661,076 | 12/1953 | Walker | 55/DIG. 25 |
| 2,773,492 | 12/1956 | Klemm, Jr. | 55/316 |
| 3,056,247 | 10/1962 | Pindzola | 55/97 |
| 3,714,956 | 2/1973 | Nelson | 137/238 |

*Primary Examiner*—Bernard Nozick
*Attorney, Agent, or Firm*—Wood, Herron & Evans

[57] ABSTRACT

A system for storing edible bulk materials under oxygen-free aseptic conditions, including an aseptic storage tank and a gas-pervious microbiological filtering assembly interconnected between the storage tank and a source of pressurized unsterilized oxygen-free inert gas. Included in the filter assembly is an elongated tubular housing within which is positioned a tubular filter element of lesser diameter having a downstream open end which communicates only with the interior of the tank, a cylindrical gas-pervious microbiological filtering body section, and upstream closed end, both of the latter of which communicate with the hollow interior of the housing, whereby pressurized unsterilized oxygen-free gas from the source flows through the cylindrical gas pervious microbiological filtering body of the filter element prior to reaching the interior of the aseptic tank.

6 Claims, 2 Drawing Figures

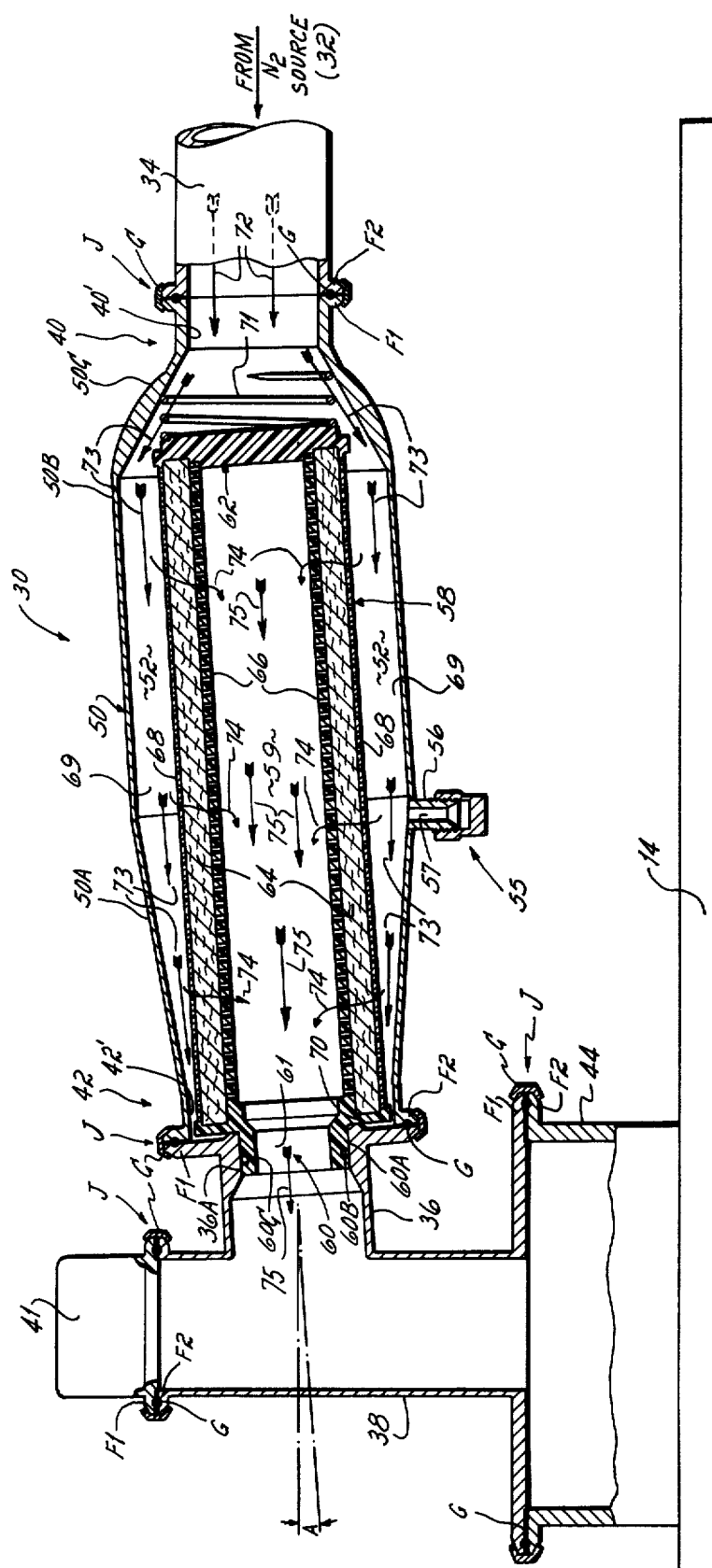

ASEPTIC STORAGE SYSTEM FOR BULK MATERIALS AND IMPROVED MICROBIOLOGICAL FILTER THEREFOR

This invention relates to contamination-inhibiting apparatus for providing microbiologically filtered oxygen-free inert gas in the unused volume of an aseptic tank, and more particularly to microbiological gas filtering apparatus connectable between the aseptic tank and a source of pressurized oxygen-free gas which maintains an effective microbiologically filtered gas pervious barrier between the downstream aseptic storage tank and the upstream non-aseptic oxygen-free gas source.

In the processing of edible material, and prior to final packaging in smaller units for consumer use, it is often necessary to store large quantities of the material in bulk form and to do so under aseptic conditions to insure ultimate purity of the material as supplied to the consumer. Often the edible bulk material must remain in the storage tank for protracted periods of time. Such is the case with, for example, tomato products, fruits and the like which are sold throughout the year, yet available for harvesting during only a few months.

In view of the protracted nature of the storage, it is important that all possible steps be taken to avoid admission into the tank of contaminants, such as micro-organisms, which when admitted even in only small quantities will eventually contaminate the entire tank. To this end, the practice has developed of substituting, with microbiologically filtered oxygen-free inert gas, oxygen-containing air which collects in partially filled tanks in the unused volume above the bulk material. By removing oxygen from the unused portion of the tank above the bulk material, multiplication of contaminants such as micro-organisms within the tank is inhibited.

Substitution of oxygen-containing air within the unused portion of the tank is usually accomplished by connecting a pressurized source of nitrogen to the interior of the tank at or near its top, i.e., above the maximum bulk material level to which the tank is filled. Nitrogen, in addition to being a relatively inexpensive oxygen-free inert gas, is also not explosive and not likely to chemically interact with the bulk material stored in the tank which it physically contacts. Since it is not practical to provide an aseptic source of pressurized nitrogen, it is necessary to provide microbiological filtering means between the nonaseptic source of nitrogen and the aseptic storage tank. Bulk storage tanks, because of their size, for example, 50,000–70,000 gallons, are often located outdoors. Outdoor placement of such tanks, particularly when located in less temperate regions subjected to low temperature, causes moisture to condense in the nitrogen filtering apparatus. It is essential that this condensate be removed, particularly in climates subjected to sub-freezing temperatures, otherwise it could freeze and clog the filter, obstructing the free flow of nitrogen to the tank.

Accordingly, it has been an objective of this invention to provide a microbiological filter between a non-aseptic source of pressurized inert oxygen-free gas and an aseptic storage tank which provides effective removal of condensate forming within the filter, and yet does so without introducing non-aseptic condensate forming upstream of the filter element on the non-aseptic side of the system into the downstream aseptic side of the system communicating with the bulk storage tank. This objective has been accomplished in accordance with certain novel and unobvious principles of this invention by providing a tubular microbiological filter element, the interior of which communicates, via a single open-end in the filter, solely with the interior of the bulk storage tank and whose exterior communicates with the interior of a housing which surrounds the filter element and connects to the source of pressurized gas. In accordance with this arrangement, gravity flow drainage into the aseptic tank of condensate forming within the tubular filter element on the downstream aseptic side of the system is produced by means of inclining the filter element downwardly toward the tank at a slight angle with respect to the horizontal. Condensate forming within the filter housing exteriorly and upstream of the filter element is caused to flow under the force of gravity from the housing without introduction into the downstream aseptic side of the system by means of a drain located in the lowermost portion of the housing on the upstream side of the filter.

Thus, inclination of the filter element promotes gravity flow into the aseptic tank of condensate forming on the downstream aseptic side of the filter, while a bottom drain in the housing promotes gravity flow to a suitable sump or the like separate from the tank of non-aseptic condensate forming upstream of the filter element in the non-aseptic side of the system, with the result that all condensate forming within the filtering means is removed, thereby preventing freezing and ultimately clogging of the filter. Moreover, such is accomplished without the introduction into the downstream aseptic side of the system of condensate forming in the upstream non-aseptic portion of the system.

In accordance with a further aspect of the invention, uniform utilization of the filter element along its length is promoted by gradually reducing the diameter of the housing as the downstream end of the cylindrical filter element is approached. This reduces the cross-sectional area of the annular path existing between the housing and the cylindrical filter element in the direction of flow, which in turn compensates for the decreasing pressure along the exterior of the filter element which would otherwise result were the cross-sectional area of the flow path between the cylindrical filter element and the housing to remain uniform in area along the length of filter.

In accordance with a further aspect of this invention, and to further maintain the aseptic condition of the bulk storage tank, the interior of the filter housing located on the upstream side of the cylindrical filter element is purposefully made smooth to avoid retention and accumulation of foreign matter within the filter housing upstream of the filter element, which if permitted to accumulate could serve as a source of contamination for the contents of the bulk storage tank.

Finally, and to further limit the possibility of contamination of the stored bulk material, the filter assembly is constructed to avoid any gas flow paths, except such as may exist through the gas pervious filtering medium itself. By reason of the elimination of unfiltered gas flow paths, such as are present when pressure relief devices are built into the filter element itself, the possibility of non-aseptic gas reaching the aseptic contents of the tank without undergoing a filtering process is eliminated, enhancing storage of the tank content under aseptic conditions.

These and other objectives and advantages of the invention will become more readily apparent from a detailed description of the invention taken in conjunction with the drawings in which:

FIG. 1 is a front elevational view of an aseptic storage system embodying, in combination with a bulk storage tank, the gas filtering assembly of this invention; and FIG. 2 is a front elevational view, in cross-section, of the upper portion of the tank and gas filtering assembly depicted in FIG. 1.

Aseptic bulk storage systems of the type to which this invention relates, as shown in FIG. 1, typically include, among other things, a large storage tank 10 in which previously sterilized bulk material, such as crushed tomatoes, fruit or the like, is adapted to be stored under aseptic conditions. Preferably the storage tank has a cylindrical mid-section 11 closed at the bottom with a conical, or funnel-shaped, bottom section 12 and at the top with a domed section 13, the latter section being provided with a selectively removable flanged man-hole cover 14. The funnel-shaped bottom section 12 facilitates removal of stored materials from the tank 10 by gravity action. The flanged man-hole cover 14 permits maintenance personnel to enter the interior of the tank for maintenance purposes.

The tank 10 can be of any suitable size and shape, and preferably is fabricated of welded steel sections to which is secured to the inside surface thereof a protective lining of glass, plastic, or the like. Such lined steel tanks are commercially available from a number of sources including The Bishopric Company, Cincinnati, Ohio.

As described in more detail in U.S. Pat. No. 3,678,955, assigned to the assignee of the present application, the tank 10 may be provided with a cleansing port 15 through which liquid cleansing solution can be introduced for cleaning and flushing the interior of the tank when free of stored material. A conduit, or pipe, 16 which is connected at one end to the cleansing port 15, is also provided to facilitate cleansing of the tank interior. An aseptic valve 17 controls the flow of cleaning solution to the interior of the tank 10 via the pipe 16. The valve 17 has an outlet port 18 connected to the conduit 16 and an inlet port 19 connectable to a source of cleansing solution (not shown). The ports 18 and 19 of valve 17 can be selectively interconnected to permit the flow of cleansing solution from a supply (not shown) to the interior of tank 10 via pipe 16 by movement of a valve actuator 9 from an inner closed position to an outer open position, in a manner described in more detail in the above-referenced United States Patent.

The tank 10 is also provided with an inlet/outlet pipe or conduit 20 through which bulk material flows when the tank is being filled, being emptied, or a sample of the stored material removed for testing. The inlet/outlet pipe 20 at its upper end is connected to the lowermost portion, or apex, of the funnel-shaped bottom section 12 of tank 10, and at its lower end is connected to port 21 of aseptic valve means 22. The valve means 22 is provided with other ports (not shown) which are connected to suitable aseptic plumbing to facilitate filling and emptying the tank with bulk material and to permit the removal of samples of bulk material from the tank for test purposes, as described in more detail in the above-referenced patent.

Also included in the aseptic bulk storage system of this invention is a microbiological filter assembly 30 connected at its upstream end to a pressurized unsterilized inert oxygen-free gas source 32, such as nitrogen, via a pipe 34. At its downstream end, the filter assembly 30 is connected to the tank 10 via a pipe 36 which extends laterally from a vertically disposed pipe 38. The pipe 38 at its lower end is secured to the man-hole cover 14 and communicates with the interior of the tank 10 via a suitably located port or opening therein, while the upper end of the pipe 38 is provided with a gas pressure gauge 41. The pressure gauge 41 provides a visual indication of the pressure of the nitrogen which fills the otherwise empty upper section 10A of the tank interior which is not filled with bulk material M.

As noted previously, it is preferable to fill the unused volume 10A of the tank interior above the surface of the bulk material M with microbiologically filtered nitrogen. In this way, in the unused volume above the bulk material, air, which contains oxygen and supports the growth of contaminating micro-organisms, is substituted by microbiologically filtered nitrogen which does not support micro-organism growth. Nitrogen is relatively inexpensive, non-explosive, and is chemically inert with respect to common edible bulk materials of the type typically stored in the tank 10. Additionally, the nitrogen, when suitably filtered by the filtering assembly 30, does not in and of itself constitute a source of contamination for the bulk material in the tank 10 when the nitrogen is present in the unused tank volume 10A above the bulk material.

With reference to FIG. 2, the nitrogen filter assembly 30 is seen connected at its upstream end 40 to a pressurized source of nitrogen gas 32 via a suitable pipe 34, and at its downstream end 42 to the interior of the tank via a pipe 36 which extends laterally from a vertical pipe 38, which vertical pipe 38, at its lower end, connects to a flanged opening 44 projecting upwardly from the man-hole cover 14. Thus, pressurized nitrogen gas from source 32 is input to the interior of the tank 10A above the bulk material M via the pipe 34, filter assembly 30, pipe sections 36 and 38, and the flanged opening 44 in the man-hole cover 14. Suitable sanitary mating flanged connections or joints J are provided to interconnect the pipes 34, 36 and 38, filter assembly 30, pressure gauge 41, and flanged opening 44 in the man-hole cover 14. The sanitary connections J each include an annular compressible gasket G sandwiched between opposed mating flange sections F1 and F2 which are urged toward each other by a circular clamp C to compress the interposed gasket G.

The filter assembly 30, considered in more detail in connection with FIG. 2, includes housing 50, preferably of stainless steel or other suitable material, which establishes or defines a hollow interior cavity or chamber 52 between the gas inlet port or opening 40' associated with the upstream end 40 of the filter assembly 30 and a downstream port or bore 42' at the downstream end 42 of the filter assembly 30. The wall section 50A of the housing 50 in the region of the downstream end 42 of the filter assembly 30 is generally frusto-conical in shape, with the diameter thereof decreasing in the direction of flow toward the downstream bore 42'. The upstream section 50B of the housing 50 is generally cylindrical in shape, having a uniform diameter. A flared housing section 50C is provided between cylindrical housing section 50B and the reduced diameter flanged upstream end 40 of filter housing 50.

A drain in the form of a nipple 56 having a bore 57 communicating with the interior of the housing 52 is provided in the lowermost portion of the housing wall. A bleed cap 55 is threaded on the nipple 56 and when in its tightened condition completely seals bore 57. Cap 55A, when loosened, permits condensate to flow from bore 57. Of course, any suitable kind of valve could be fitted to nipple 56 to open and close bore 57. Placement of the drain 55 in this manner promotes gravity flow of moisture condensing within the housing interior 52 exteriorly of a microbiological filter element 58 to be described.

The filter element 58 is generally in the form of a cylindrical tube having a cylindrical end structure 60 with an opening 61 communicating with the tank interior 10A via pipe sections 36 and 38 and flanged opening 44 in the man-hole cover 14. A radial flange 70 extends outwardly from the end structure 60 at a point upstream of the opening 61. Filter element 58 also includes a closed upstream end 62 in the form of a circular disc, preferably fabricated of a suitable plastic such as polypropylene, and an intermediate section in the form of a cylindrical gas pervious microbiological filtering medium 64 disposed between the flange 70 and the closed end 62. Located interiorly of the cylindrical gas pervious medium 64 and formed integral with the open end structure 60 and flange 70 is a perforated inner cylindrical filter support member 66. Located exteriorly of the cylindrical gas pervious filter medium 64 is an outer cylindrical mesh 68, preferably fabricated of a suitable plastic such as polypropylene.

Preferably the perforated inner cylindrical support member 66, the cylindrical open end structure 60, and the flange 70 are integrally fabricated of a suitable plastic such as polypropylene. With such an integral construction, the filter medium 64 can be assembled by sliding it over the support member 66 with its left end abutting the flange 70. With the filter medium 64 so positioned, the outer cylindrical mesh or cover 68 can be assembled by sliding it over the filter medium 64 with its downstream end abutting flange 70. With the filter medium 64 and the outer cylindrical mesh 68 in place with their downstream ends abutting the radial flange 70, the disc 62 can be assembled by securing it to the right-hand or upstream end of the cylindrical support member 66 and the outer mesh 68. The maximum diameter of the filter element 58 is dimensioned to be smaller than the diameter of the downstream bore 42' of the filter housing 50 to facilitate insertion of the filter element 58 into the housing interior 52 via the downstream bore 42'.

To positively locate the filter element 58 in the desired orientation with respect to the laterally extending pipe 36 and the housing interior 52, the outer cylindrical surface 60A of the end structure 60, which takes the form of a short tubular section, is dimensioned to snugly fit within the inner bore 36A of the flanged pipe 36. A suitable O-ring 60B is located in the circumferential slot 60C formed in the outer wall 60A of the end structure 60 to establish a seal between bore 36A and surface 60A. A helical compression spring 71 located between the disc 62 and the flared section 50C of housing 50 biases the filter element 58 against the flanged end of pipe 36, maintaining it in the orientation desired.

The filter element 58, when suitably located within the housing interior 52 by engagement of surface 60A with bore 36A, establishes an annular gas flow region 69 between the cylindrical plastic mesh cover 68 and the housing wall sections 50A and 50B. Flow region 69 is of uniform cross-sectional area along the length of the filter element 58 circumscribed by the cylindrical housing section 50B and is of gradually decreasing cross-sectional area along the length of the filter element in the region circumscribed by the frusto-conical housing section 50A. The decreasing cross-sectional flow area of the annular region 69 between the downstream portion of the plastic mesh cover 68 and the frusto-conical housing section 50A causes the flow of gas radially inwardly through the filter medium 64, which would normally tend to decrease as the open end structure 60 is approached due to pressure drop along the length of the filter, to remain substantially uniform along the length of the gas pervious filter. With the gas flow per unit length of the gas pervious medium 64 substantially constant in the region with tapered housing section 50A, utilization of the filtering capability of the gas pervious filter medium 64 along its length is substantially uniform. As a consequence, the upstream end of the medium in the region of cylindrical housing section 50B does not lose its filtering capability at a faster rate than the downstream end adjacent tapered housing section 50A as would otherwise tend to occur were not the housing 50A tapered to provide a decreasing cross-sectional annular flow path.

The filter medium 64, which may be conventional gas pervious microbiological filter paper and preferably impregnated with silicone, is hydrophobic, to promote shedding of moisture condensing on the interior and exterior surfaces of the filter medium. Since the tank 10 and filter assembly 30 are often located outdoors where they are subjected to sub-freezing temperatures, moisture condensing on the interior and exterior of the filter medium 64, were it permitted to remain there, would ultimately freeze and clog the filter medium inhibiting the flow of gas through the filter and ultimately to the tank 10. Moisture condensing within housing 50 in the annular flow region 69 exteriorly and upstream of the filter element 58 collects in the bottom of the housing where it is drained under the force of gravity via the drain 55 to a suitable sump (not shown). To facilitate draining of moisture condensing interiorly and downstream of the filter element 58 in the filter cavity 59, the filter element is angled slightly with respect to the horizontal, for example, at least approximately 3½ as indicated by angle A. Condensate forming within the cavity 59 downstream of the filter element 58 will flow under the force of gravity back into the tank 10 via opening 61 of the filter element 58, pipe 36, pipe 38, and flanged opening 44 in the man-hole cover 14.

Thus, angulation of the filter element 58 causes moisture condensing in the interior cavity 59 downstream of the filter element 58, which is on the aseptic side of the filter element, to be returned by gravity flow to the interior of the tank 10 which is also in an aseptic condition. Similarly, location of the drain 55 in the lowermost section of the housing 50 causes condensate forming exteriorly and upstream of the filter element 58 in cavity 69, which is on the non-aseptic side of the filter element, to drain to a sump (not shown), thereby avoiding contamination of the aseptic contents of the tank 10 by condensate forming on the non-aseptic side of the filter element 58. It is thus apparent that the filter medium 64 constitutes a gas pervious microbiologically filtering barrier between the downstream aseptic side of the filter system, including the interior of the tank 10, pipes 36 and 38, and inner filter cavity 59, and the upstream non-aseptic side of the system constituting the annular gas flow region 69 surrounding the filter medium 64 and the pipe 34.

The condensate drainage characteristics of the filter of this invention are also useful in circumstances where the filter assembly 30 is sterilized with steam while in place, i.e., connected between pipes 34 and 36, from a steam source connected to pipe 34. Under such steam sterilizing circumstances, steam condensing upstream of the filter element 58 drains via drain 55, while steam condensing downstream of filter element 58 drains into the tank via pipes 36 and 38.

Filtering mediums 64 suitable for use in the apparatus of this invention are known as "microbiological filters" and are commercially available from Pall Trinity Micro Corp., of Cortland, New York, designated Model No. AB-1-AX-3AK5. The illustrative microbiological filter element 64 has a length of 9½ inches, a diameter of 3 inches, an effective filter area of 5 square feet, a collapse pressure of 75 psi, a gas flow rate of 10 cubic feet per minute at an inlet gage pressure of 10 psi, and a 100% effectiveness in filtering out microbiological particles exceeding 0.35 microns.

Significantly, the only gas flow path between the nitrogen supply pipe 34 and the pipe 36 communicating with the tank interior 10A is via the gas pervious microbiological filtering medium 64. This assures that all gas flow from the source 32 to the tank interior 10A will be subjected to a microbiological filtering process, thereby minimizing the possibility of contaminant flow from the upstream side of the filter which is non-aseptic to the downstream side of the filter which is aseptic. Placement of a pressure relief valve in, for example, the disc 62, which would be relieved to provide a by-pass flow path around the filter medium 64 in the event of build-up of pressure to a predetermined level, should be avoided. Such a pressure relief by-pass path would constitute a potential unfiltered flow path for gas from the non-aseptic upstream side of the filter element 58 to the aseptic downstream side, and must be avoided to assure maintenance of the aseptic condition of the tank contents.

Preferably the interior surface of the housing 50 exteriorly and upstream of the filter elements 58 is smooth to avoid retention and accumulation of foreign matter within the housing which, when the pressurized source 32 is connected to the filtered assembly 30 could conceivably be blown through the filter into the tank, or which could, if allowed to accumulate, constitute a source of contamination.

In operation, pressurized nitrogen from source 32 enters the interior 52 of housing 50 via pipe 34 and gas inlet port 40' at the upstream end of the housing, as indicated by arrow 72. The gas then flows into the annular cavity 69 between the cylindrical outer mesh 68 and the housing walls 50A and 50B, as indicated by arrows 73. Finally, the gas passes radially through the microbiological filter medium 64, as indicated by arrows 74, and then flows axially out of cavity 59 into the tank interior 10A via pipes 36 and 38, as indicated by arrows 75.

The preferred embodiment of the invention has been described in connection with the microbiological filtering of a gas which is both oxygen-free to inhibit microorganism growth and chemically inert to avoid reacting with stored material. However, the apparatus of this invention can be utilized to microbiologically filter gases which are neither inert nor oxygen-free. For example, in applications of the type disclosed herein for aseptic storage of bulk material where conditions promoting micro-organism growth are to be avoided, certain oxygen-containing gases, such as carbon dioxide, can be utilized to accomplish this purpose, and the filter of this invention is nevertheless useful for the purpose of microbiologically filtering the oxygen-containing microorganism growth-inhibiting carbon dioxide gas. Alternatively, in certain applications it may be desirable to have the aseptically stored bulk material chemically react with a microbiologically filtered gas, as where a bulk material is to undergo fermentation while stored under aseptic conditions. Under such circumstances it may be desirable to microbiologically filter a chemically reactive gas, and the filter of this invention could be used.

From the foregoing disclosure of the general principles of the present invention and the above description of the preferred embodiment, those skilled in the art will readily comprehend various modifications to which the present invention is susceptible. Accordingly, it is desired to be limited only by the scope of the following claims.

What is claimed is:

1. Apparatus for aseptically storing bulk material comprising:

an aseptic tank into the interior of which sterile bulk material is placed for storage, said tank having a port therein communicating with said tank interior through which pressurized microbiologically filtered gas is admitted, and a gas filtering assembly interconnecting said tank port and a source of unsterilized pressurized gas, said filtering assembly including:

a. an elongated tubular housing having walls which define an elongated cavity and oppositely disposed gas inlet and outlet ports in communication with said cavity, said inlet gas port being connectable to a source of unsterilized pressurized gas and said outlet gas port being connected to said tank port, said housing having a condensate drain formed in the wall thereof which is disposed in the bottom region of the housing to permit gravity flow therefrom of nonaseptic condensate which collects in the bottom of the housing cavity, and b. an elongated tubular gas pervious microbiological filtering element disposed within said housing cavity and having an open end connected to said gas outlet port of said housing, an intermediate gas pervious tubular microbiological filtering section spaced from said housing wall to establish therewith an elongated annular gas flow path, and a closed end disposed remote from said open end, whereby said sterile tank interior is isolated from said housing cavity by said filter element such that the only gas flow path existing between said gas inlet and said tank interior is through said filter element, said filter element being disposed in inclined relation to the horizontal with the open end thereof lowermost to promote gravity flow into said tank interior of sterile condensate forming within said intermediate tubular filter section.

2. The apparatus of claim 1 wherein the interior walls of said housing are smooth to avoid accumulation of foreign material within said housing which could form a source of contamination for bulk materials stored within said tank.

3. The apparatus of claim 1 wherein said filter element is cylindrical with uniform diameter along its longitudinal axis, and wherein said housing is generally frusto-conical in shape between said drain and gas outlet end with the diameter thereof decreasing toward said outlet end to establish in conjunction with said uniform diameter filter element an annular flow path of decreasing cross-sectional area to promote uniformity in pressure differential across said filter element along the length thereof to thereby promote a uniform gas flow rate through said filter along the length thereof.

4. The apparatus of claim 3 wherein the interior walls of said housing are smooth to avoid accumulation of foreign material within said housing which could form a source of contamination for bulk materials stored within said tank.

5. The apparatus of claim 1 wherein said tank port is formed in a flanged fitting extending from said tank, said open end of said filter element includes a short tubular section dimensioned to snugly fit in said tank port, and said housing includes a flange surrounding said outlet port which mates with said tank flange, whereby the snug interfit between said short tubular filter section and said tank port positively locates said filter element in a predetermined position within said housing when said tank and housing flanges are secured in mating relation.

6. The apparatus of claim 5 wherein said filter element is cylindrical with uniform diameter along its longitudinal axis, and wherein said housing is generally frusto-conical in shape between said drain and gas outlet end with the diameter thereof decreasing toward said outlet end to establish in conjunction with said uniform diameter filter element an annular flow path of decreasing cross-sectional area to promote uniformity in pressure differential across said filter element along the length thereof to thereby promote a uniform gas flow rate through said filter along the length thereof.

* * * * *

UNITED STATES PATENT OFFICE
CERTIFICATE OF CORRECTION

PATENT NO. : 3,918,942
DATED : November 11, 1975
INVENTOR(S) : Steve A. Rechtsteiner et al It is certified that error appears in the above—identified patent and that said Letters Patent are hereby corrected as shown below:

Column 5, line 6, "55A" should be --55--.

Column 6, line 50, insert the mark "°" behind the numbers 3-1/2.

Signed and Sealed this sixteenth Day of March 1976

[SEAL]

Attest:

RUTH C. MASON
Attesting Officer

C. MARSHALL DANN
Commissioner of Patents and Trademarks